(12) United States Patent
Hsieh

(10) Patent No.: US 7,392,711 B2
(45) Date of Patent: Jul. 1, 2008

(54) INSERTABLE STRAIN GAUGE SPANNER

(76) Inventor: Chih-Ching Hsieh, 5F.-2, No. 181, Sec. 2, Mei Tsun Rd., South District, Taichung (TW)

( * ) Notice: Subject to any disclaimer, the term of this patent is extended or adjusted under 35 U.S.C. 154(b) by 0 days.

(21) Appl. No.: 11/352,345

(22) Filed: Feb. 13, 2006

(65) Prior Publication Data

US 2007/0186688 A1 Aug. 16, 2007

(51) Int. Cl.
*G01L 3/18* (2006.01)
(52) U.S. Cl. ............. 73/862.21; 73/862.22; 73/862.24; 73/862.25; 73/862.26; 73/862.23
(58) Field of Classification Search .. 73/862.21–862.26
See application file for complete search history.

(56) References Cited

U.S. PATENT DOCUMENTS

| 4,779,494 | A * | 10/1988 | Quach | 81/443 |
| 6,234,051 | B1 * | 5/2001 | Bareggi | 81/479 |
| 6,968,759 | B2 * | 11/2005 | Becker et al. | 81/479 |
| 7,047,849 | B2 * | 5/2006 | Lai | 81/479 |
| 7,111,532 | B2 * | 9/2006 | Wu | 81/478 |
| 7,182,005 | B1 * | 2/2007 | Hsieh | 81/478 |
| 2007/0044599 | A1 * | 3/2007 | Hsieh | 81/177.85 |
| 2007/0062346 | A1 * | 3/2007 | Hsieh | 81/177.7 |

* cited by examiner

*Primary Examiner*—Edward Lefkowitz
*Assistant Examiner*—Freddie Kirkland, III

(57) ABSTRACT

An insertable strain gauge spanner which comprises a spanner body having a rod body and a driving head insertable into the rod body; the rod body having a handle and an inserting opening at one end thereof; the inserting opening can be received the driving head; the rod body being installed with a strain gauge; a lower end of the rod body being formed as an inserting opening; the inserting opening being in contact with the strain gauge; thereby the twisting force from the driving head can be transferred to a sensing end of the strain gauge; the twisting force being displayed in a window of the strain gauge; and the driving head having an inserting end with a shape corresponding to that of the inserting opening; and the orientation of the driving head with respect to the rod body is adjustable.

1 Claim, 5 Drawing Sheets

INSERTABLE STRAIN GAUGE SPANNER

FIELD OF THE INVENTION

The present invention relates to spanners, and in particular to an insertable strain gauge spanner, wherein the driving head is adjustable by rotating through 90 degrees and then inserted into the inserting opening of a handle of the spanner. As a result the twisting force will not be transferred to the sensing end of the strain gauge so as to protect the strain gauge from being destroyed.

BACKGROUND OF THE INVENTION

Spanners with strain gauges are more and more popular because it can measure the strains in operation so that the user can determine the applied force and to control the size of the applied force not to be too large so as to destroy the element to be released.

There are many kinds of spanners with strain gauges are developed. In one prior art, disclosed in Taiwan Patent No. 284306, the strain gauge spanner is installed with a strain gauge for determining the strain gauge in operation so that the user can determine that the element to be released has been released to a desired level. Thus, the element will not be too loose or too tight. In this prior art the spanner has a driving head and a rod body. The rod body has an inclined surface which is in contact with the strain gauge. When the driving head serves to drive an element, the twisting force will be transferred to the strain gauge through the inclined surface. Thus the strain gauge can measure the twisting force. If the twisting force is over a predetermined value, the strain gauge is possibly destroyed. Thus the use of the strain gauge spanner is limited.

Furthermore, in this prior art, the use of the spanner must be adjusted to an orientation matched to the inclined surface. If the user drives an element along another direction, the strain gauge cannot measure the twisting force. Thereby the operation is inconvenient. Thus, it is not practical.

SUMMARY OF THE INVENTION

Accordingly, the primary object of the present invention is to provide an insertable strain gauge spanner, wherein the driving head is adjustable by rotating through 90 degrees and then inserted into the inserting opening of the a handle of the spanner. As a result the twisting force will not be transferred to the sensing end of the strain gauge so as to protect the strain gauge from being destroyed.

To achieve above objects, the present invention provides an insertable strain gauge spanner which comprises a spanner body having a rod body and a driving head insertable into the rod body; the rod body having a handle and an inserting opening at one end thereof; the inserting opening can be received the driving head; the rod body being installed with a strain gauge; a lower end of the rod body being formed as an inserting opening; the inserting opening being in contact with the strain gauge; thereby the twisting force from the driving head can be transferred to a sensing end of the strain gauge; the twisting force being displayed in a window of the strain gauge; and the driving head having an inserting end having a shape corresponding to that of the inserting opening; and the orientation of the driving head with respect to the rod body is adjusted by adjusting the orientation of the inserting end with respect to the driving opening so as to avoid a great twisting force is transferred to the strain gauge from the driving head.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figures 1, 2:
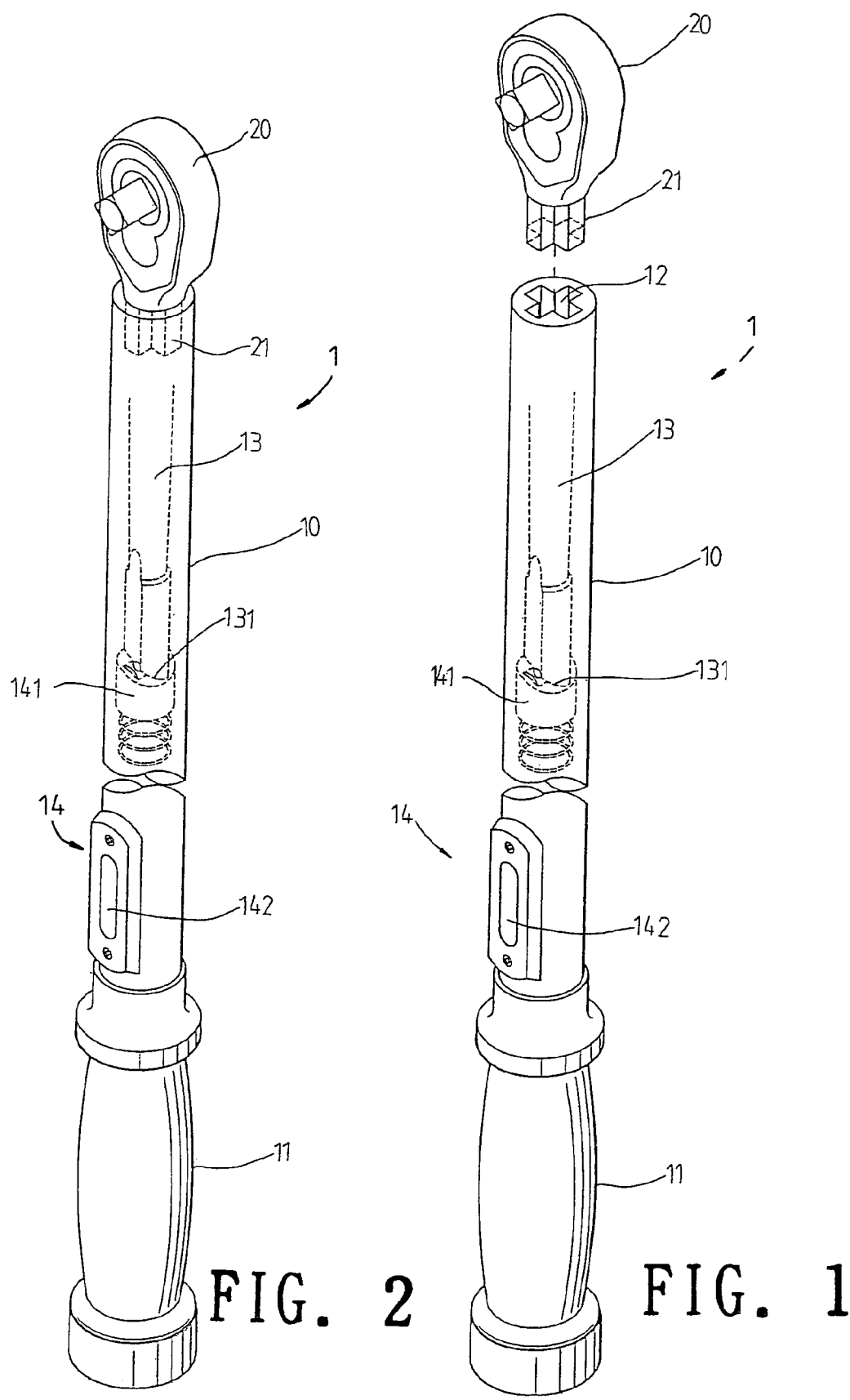
FIGS. 1 and 2 are perspective views of the insertable strain gauge spanner of the present invention.
Figure 3:
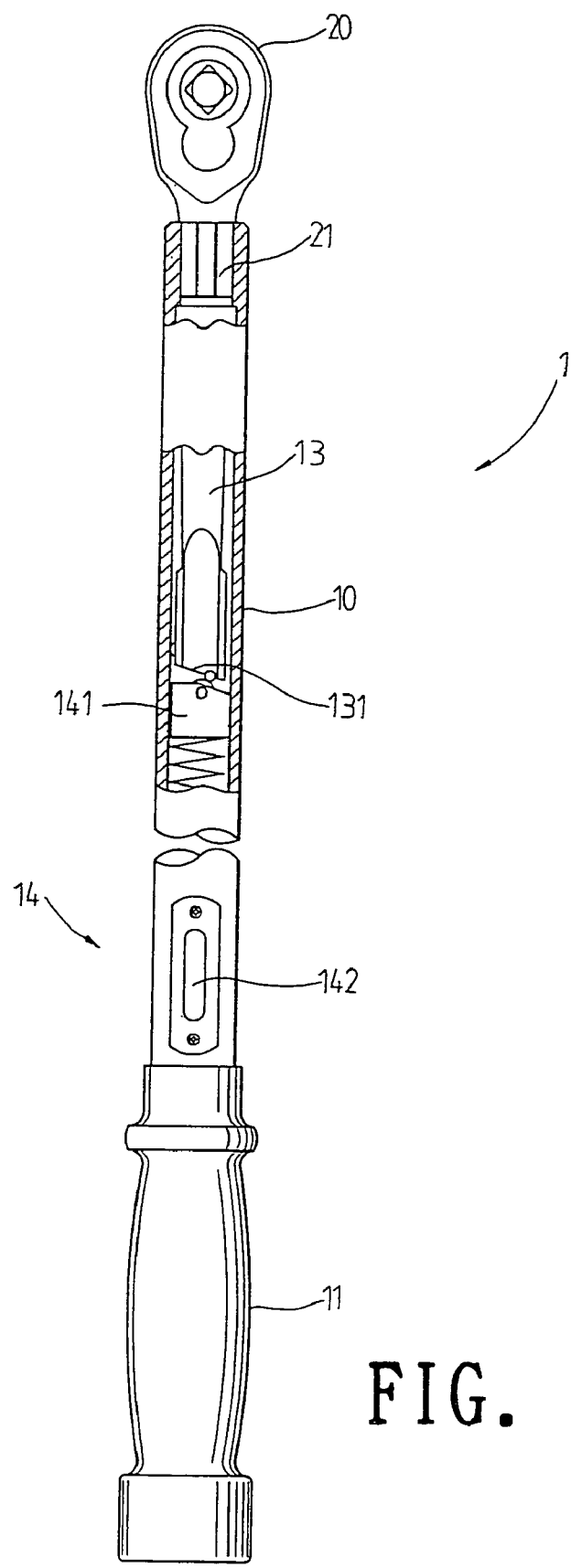
FIG. 3 is schematic cross sectional view of the insertable strain gauge spanner of the present invention.

With reference to FIGS. 1 to 3, the present invention is illustrated. The present invention has the following elements.

A spanner body 1 has the effect of measuring twisting forces. The spanner body 1 has a rod body 10 and a driving head 20 insertable into the rod body 10.

The rod body 10 has a handle 11 and an inserting opening 12 at one end thereof. The inserting opening 12 can receive the driving head 20. In this the present invention, the inserting opening 12 has a cruciform shape. However this is not used to confine the scope of the present invention.

A connecting rod 13 is installed in the rod body 10 and a strain gauge 14. A portion at an upper end of the connecting rod 13 near the inserting opening 12 is interacted with the driving head 20 inserted into the inserting opening 12. A lower end of the rod body 10 is formed as an inserting opening 12. The inserting opening 12 is in contact with the strain gauge 14. Thereby the twisting force from the driving head 20 can be transferred to the sensing end 141 of the strain gauge 14. The twisting force can be displayed in a window 142 of the strain gauge 14 (the measuring principle is known in the art and thus the detail will not be described herein).

The driving head 20 has the effect of driving a screw or engaging a threaded element. One end of the driving head 20 has an inserting end 21 having a shape corresponding to the inserting opening 12. In this embodiment, the inserting end 21 has a cruciform so that the driving head 20 can be inserted into the inserting opening 12.

Figure 4:
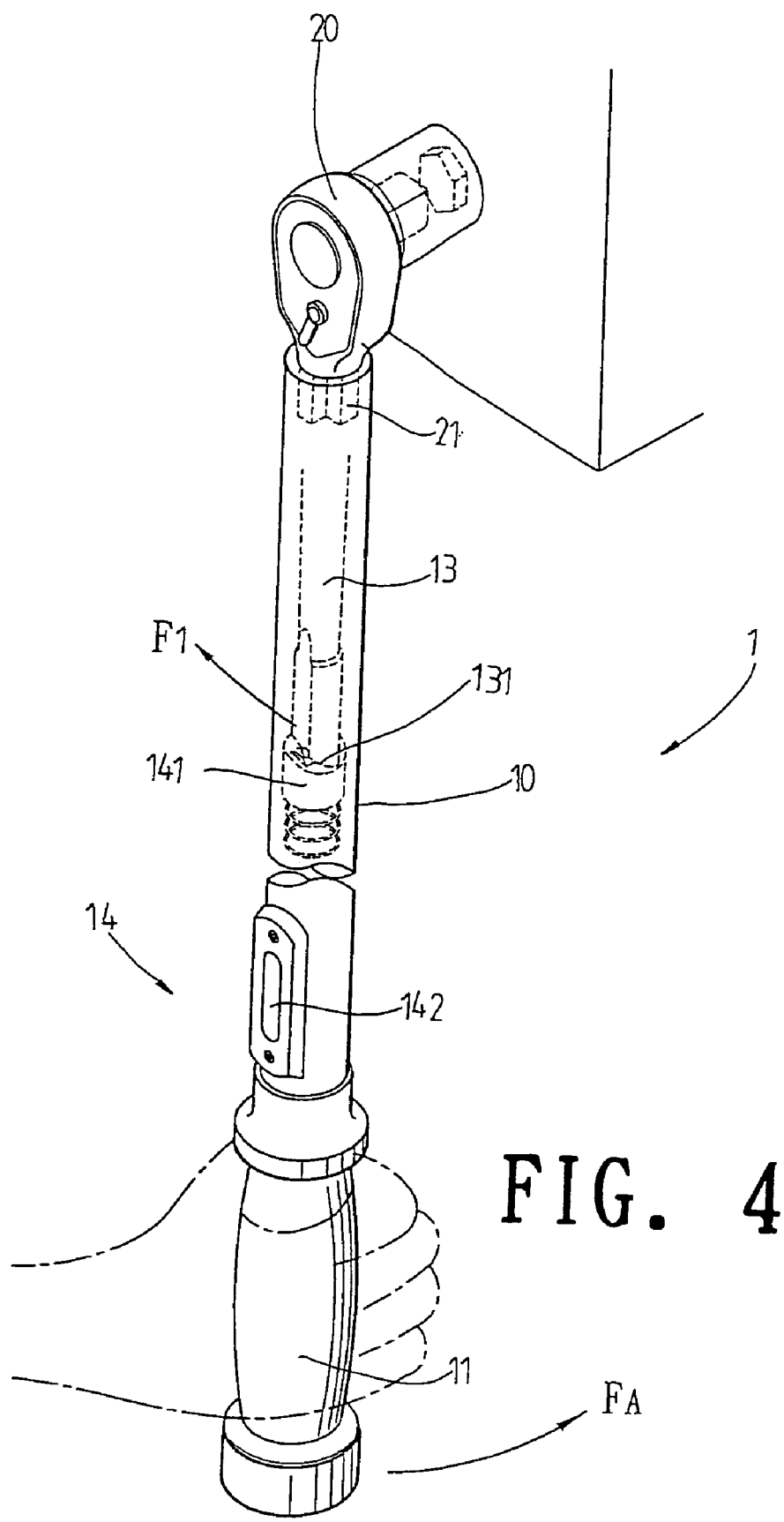
FIGS. 4 and 5 are schematic views of the insertable strain gauge spanner of the present invention.
Figure 5:
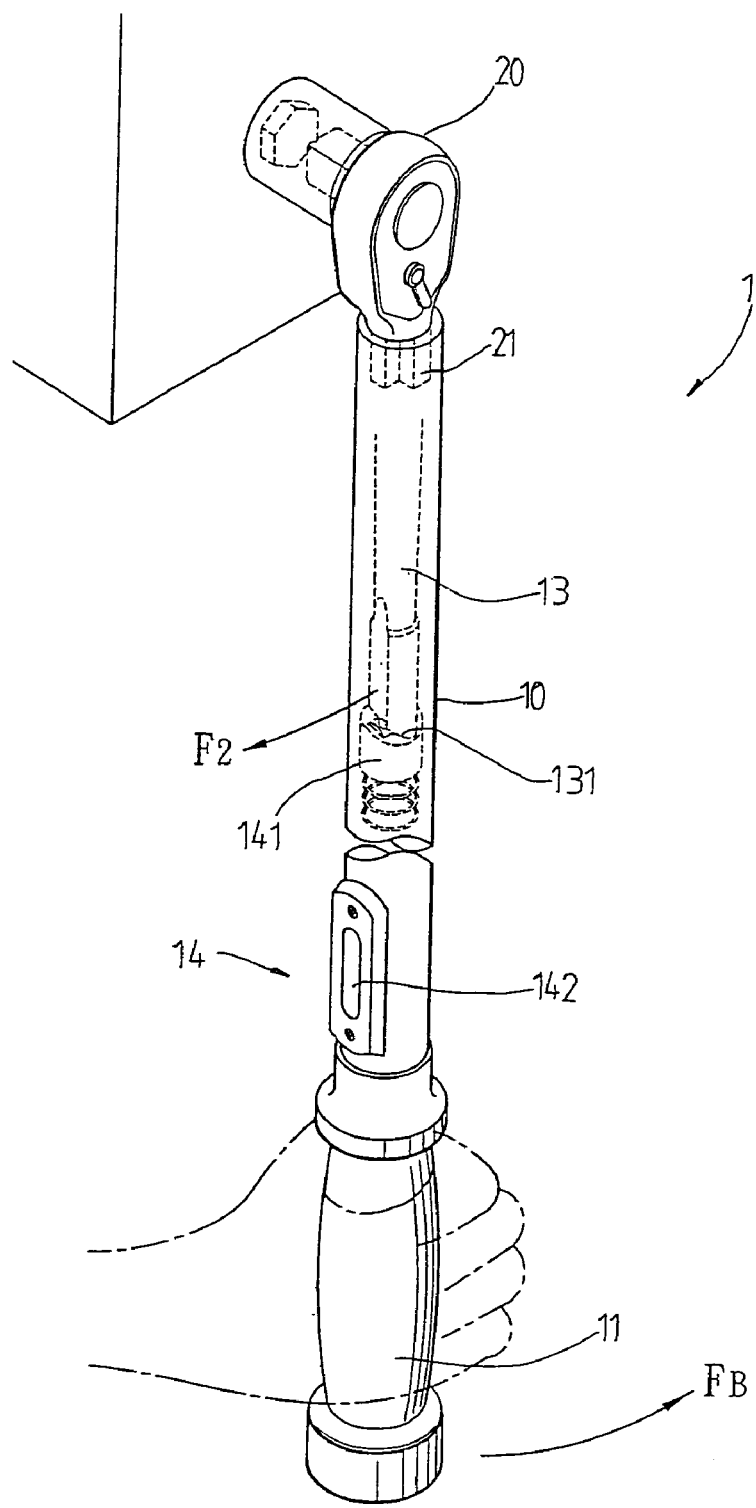

In use, referring to FIGS. 4 and 5, when the user applies a force $F_A$ to handle 11 so that the driving head 20 drive a screw unit. The sensing end 141 of the strain gauge 14 will sense the react force F1 through the inclined surface 131 of the connecting rod 13. If the screw unit is too tightly to be released, a great force is necessary so that the driving head 20 suffers from a great twisting force. If the react force F1 is too great to be over the limit of the strain gauge 14, the accuracy of the strain gauge 14 will be affected and possible that the strain gauge 14 is destroyed.

Therefore, if the twisting force is greater, the driving head 20 can be pulled out and then is rotated through 90 degrees and then is inserted into the inserting opening 12. As shown in FIG. 5, when a force $F_B$ is applied, a great react force $F_2$ generates. The react force $F_2$ is not along the inclined surface 131 to the sensing end 141 of the strain gauge 14, but the react force is transferred to a lateral side of the inclined surface 131. Thus the react force $F_2$ will not apply to the sensing end 141 of the strain gauge 14. It will not affect the strain gauge 14. The strain gauge 14 will not be destroyed.

Figures 6, 7:
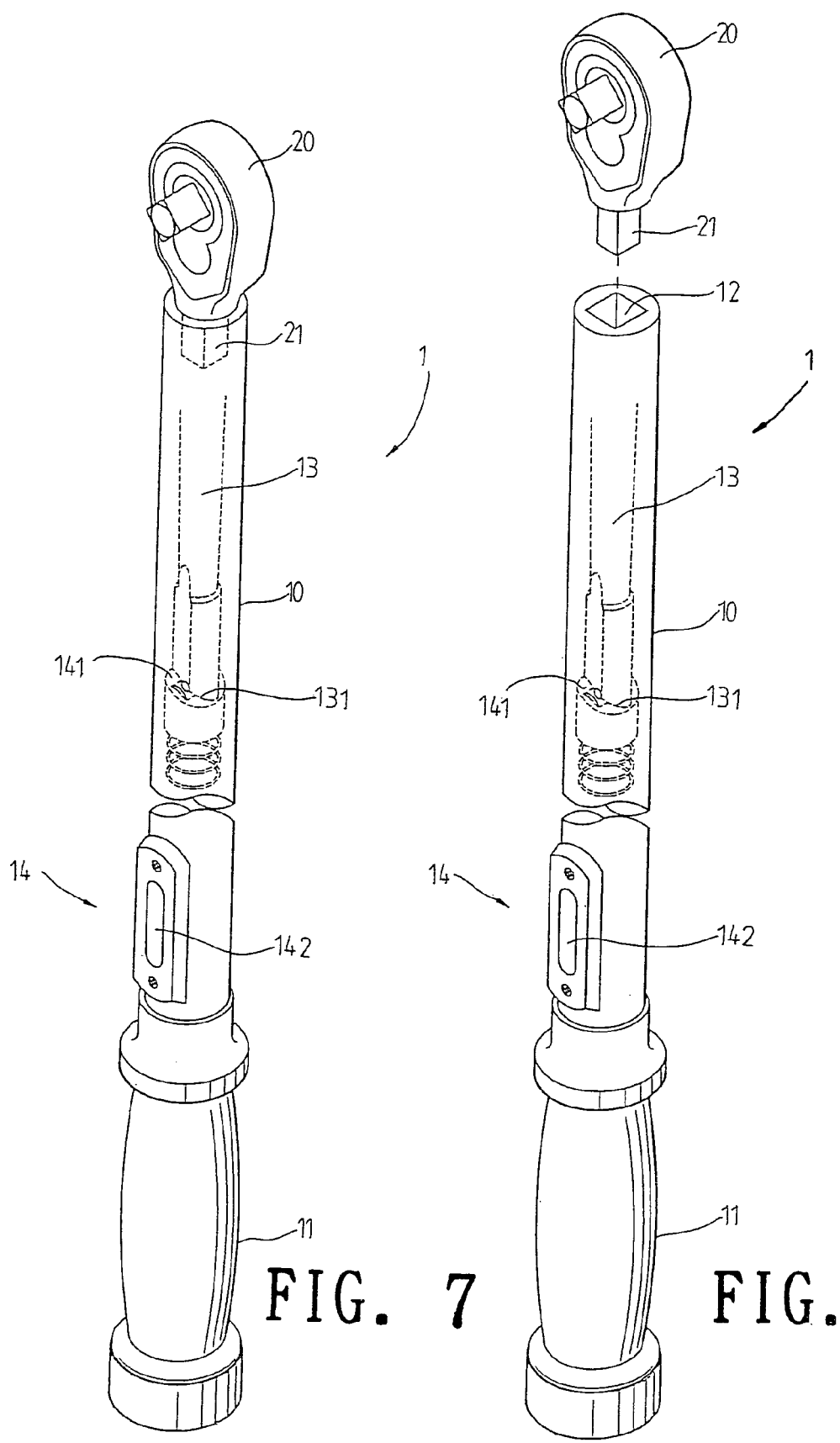
FIGS. 6 and 7 are perspective views of the second embodiment of the present invention.

In above mentioned embodiment, the inserting opening 12 and the inserting end 21 have a cruciform. However referring to FIGS. 6 and 7, the inserting opening 12 and inserting end 21 have square shapes. Similarly, the driving head 20 can be adjusted by rotating through 90 degrees and then inserted into the inserting opening 12. As a result the twisting force will not be transferred to the sensing end 141 of the strain gauge 14 along the inclined surface 131 of the connecting rod 13.

However the shapes of the inserting opening 12 and inserting opening 12 are not confined to above mentioned shapes, other shapes are permissible in the present invention. All these are within the scope of the present invention.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An insertable strain gauge spanner comprising;

a spanner body 1 having a rod body and a driving head insertable into the rod body;

the rod body having a handle and an inserting opening at one upper end of the rod body; the inserting opening can receive the driving head; the rod body being installed with a strain gauge; the inserting opening being in contact with the strain gauge; thereby the twisting force from the driving head can be transferred to a sensing end of the strain gauge; the twisting force being displayed in a window of the strain gauge; and the driving head having an inserting end a shape corresponding to that of the inserting opening; and the orientation of the driving head with respect to the rod body is adjustable by adjusting the orientation of the inserting end with respect to the inserting opening so as to avoid a great twisting force is transferred to the strain gauge from the driving head wherein a connecting rod is installed in the rod body; a portion at an upper end of the connecting rod near the inserting opening is interacted with the driving head inserted into the inserting opening; and a lower end of the connecting rod is formed as an inclined surface for transferring a react force from the driving head to the strain gauge to indicate the twisting force wherein the inserting opening and inserting end have a cruciform shape.

* * * * *